United States Patent
Haas et al.

(10) Patent No.: US 7,178,213 B2
(45) Date of Patent: Feb. 20, 2007

(54) RIVET DRIVING ANVIL RETENTION SYSTEM AND METHOD

(75) Inventors: Wayne Haas, Ofallon, MO (US); John Perniciaro, Ballwin, MO (US); Gregory Benfer, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 414 days.

(21) Appl. No.: 10/862,485

(22) Filed: Jun. 7, 2004

(65) Prior Publication Data
US 2005/0268453 A1 Dec. 8, 2005

(51) Int. Cl.
*B21J 15/34* (2006.01)
*B23P 11/00* (2006.01)

(52) U.S. Cl. .......................... 29/243.523; 29/243.521; 29/243.522; 29/243.53; 72/391.4

(58) Field of Classification Search ............................... 29/243.521–243.529, 243.53; 72/391.2, 72/391.4, 391.6, 381.8
See application file for complete search history.

(56) References Cited

U.S. PATENT DOCUMENTS

| 5,315,744 A | * | 5/1994 | Denham et al. | ......... 29/243.53 |
| 6,018,978 A | * | 2/2000 | Aniento | ..................... 72/391.4 |

* cited by examiner

*Primary Examiner*—David Jones
(74) *Attorney, Agent, or Firm*—Ostrager, Chong, Flaherty & Broitman P.C.

(57) ABSTRACT

A driving anvil washer retaining apparatus (12) for a rivet gun (14) includes a magnetized element (21). The magnetized element (21) is coupled to the rivet gun (14) and retains an anvil washer (52) during installation of a rivet (82). A method of installing a rivet (82) includes inserting a stem (46) of a rivet assembly (80) into a rivet gun nose (22) having at least one magnetized portion (21). A rivet (82) of the rivet assembly (80) is inserted into at least one object. The stem (46) is removed from the rivet assembly (80). A driving anvil washer (52) is retained via the magnetized portion (21).

22 Claims, 4 Drawing Sheets

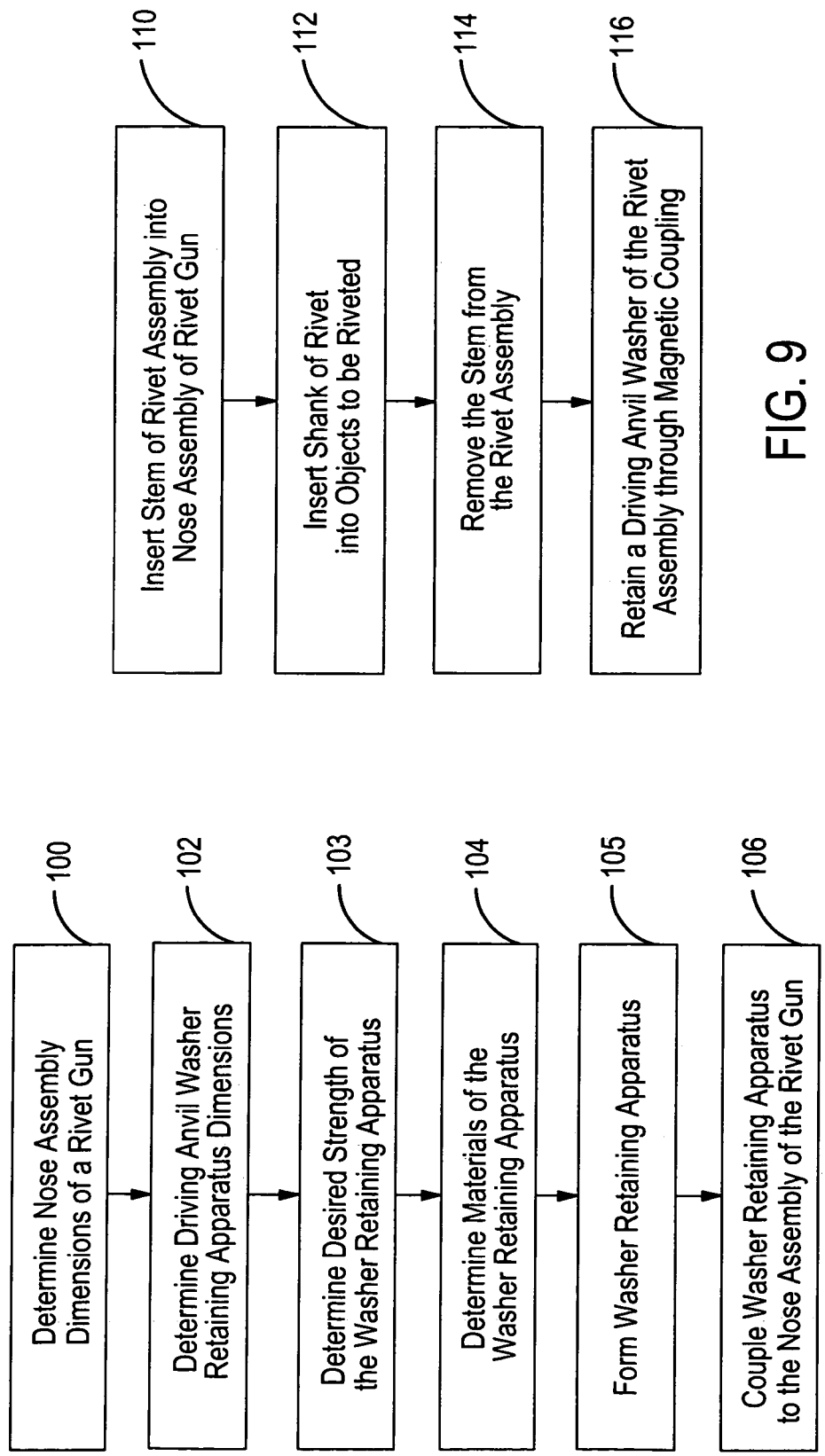

RIVET DRIVING ANVIL RETENTION SYSTEM AND METHOD

TECHNICAL FIELD

The present invention relates generally to fasteners and fastening systems. More particularly, the present invention relates to a system and method of retaining a driving anvil washer during the application of a blind rivet on an aircraft.

BACKGROUND OF THE INVENTION

Aircraft safety is an ongoing concern for aircraft producers. An unknown loose object on board an aircraft may cause an aircraft to malfunction or not operate as designed thereby decreasing safety of the aircraft. In the art, unknown loose objects are referred to as foreign object debris (FOD). FOD is difficult to detect and many hours of searching for FOD occurs during the production of an aircraft, to assure the aircraft is free from loose objects, before the aircraft leaves a production facility or is operated. Moreover, because the detection of FOD can rely on visual inspection, it can be subject to human error. Furthermore, confined nature of an aircraft structure hinders vehicle through inspection.

FOD may be of various sizes and shapes and can go undetected in large aircraft. A large aircraft has various cavities, pockets, and crevices that cause the process of detecting FOD to be difficult. For example, a small FOD item, such as a rivet or nut, lying in a dark crevice may go undetected. The larger the amount of undetected FOD the increased likelihood of an aircraft system malfunctioning.

Thousands of rivets are typically used as fasteners on current aircraft. The rivets are attached or fastened via a rivet gun. A common example of a type of rivet that is often used is the blind rivet. Before installation the rivets are part of a rivet assembly. The rivet assembly includes a stem, a driving anvil or anvil washer, a holding ring and the rivet itself. During the installation of a rivet, a stem is inserted into a nose of a rivet gun. The shank of the rivet is inserted into a hole and pressure is applied on the head of the rivet. The stem is pulled out from the rivet causing a portion of the rivet that is extending through the object to increase in diameter. The head of the rivet and the expanded inserted portion lock the rivet in place.

The anvil washer holds the ring down tight on the rivet such that during and after installation of the rivet the ring does not loosen. When the ring is loose the rivet is not tightly fastened to the objects of interest and therefore must be removed and replaced. During installation of the rivet the stem is removed and caught by the rivet gun. However, often the anvil washer is not retained and can fall into the aircraft creating FOD. The anvil washers are typically small and difficult to find.

Thus, there exists a need for an improved technique for installation of rivets without the creation of FOD, thereby, reducing time and costs involved in manufacturing of an aircraft.

SUMMARY OF THE INVENTION

The foregoing and other advantages are provided by multiple embodiments of the present invention. In one embodiment of the present invention, a driving anvil washer retaining apparatus for a rivet gun is provided. The apparatus includes a magnetized element. The magnetized element is coupled to the rivet gun and retains an anvil washer during installation of a rivet.

In another embodiment of the present invention a method of installing a rivet is provided. The method includes inserting a stem of a rivet assembly into a rivet gun nose having at least one magnetized portion. A rivet of the rivet assembly is inserted into at least one object. The stem is removed from the rivet assembly. A driving anvil washer is retained via the magnetized portion.

The embodiments of the present invention provide several advantages. One such advantage is the provision of utilizing a magnetized rivet gun nose apparatus to retain or capture driving anvil washers and the like during the installation of a rivet. The use thereof prevents and minimizes the creation of foreign object debris.

Another advantage provided by an embodiment of the present invention is the inclusion of an easy, quick, and inexpensive method of retaining driving anvil washers and the like during the installation of a rivet. As such the method minimizes manufacturing time and costs.

The present invention itself, together with other attendant advantages, will be best understood by reference to the following detailed description, taken in conjunction with the accompanying figures.

BRIEF DESCRIPTION OF THE DRAWING

For a more complete understanding of this invention reference should now be had to the embodiments illustrated in greater detail in the accompanying figures and described below by way of examples of the invention wherein:

FIG. 8 is a logic flow diagram illustrating a method of forming a driving anvil washer retaining apparatus for a rivet gun in accordance with an embodiment of the present invention; and FIG. 9 is a logic flow diagram illustrating a method of installing a rivet in accordance with another embodiment of the present invention.

DETAILED DESCRIPTION

While the present invention is described with respect to an apparatus for and a method of retaining a driving anvil washer during installation of a rivet, the present invention may be adapted for other similar applications. The present invention may be applied to various rivet guns, riveters, and rivet installation systems, such as auto-feed riveters, com pression riveters, orbital riveters, and blind rivet guns. The present invention may be utilized in the installation of various rivets, such as blind rivets, Klik Rivet-Nuts™, pop rivets, Olympic-loc™ rivets, solid rivets, and the like. The present invention may be applied to the installation of rivets in many fields and industries, such as aerospace, automotive, naval, railroad, commercial, and residential.

Also, in the following description the term "rivet gun" refers to any tool used for the installation of a rivet. A rivet gun may be used to hold, couple, align, or apply pressure to a rivet or a portion of rivet assembly, such as a stem or a driving anvil washer, during the installation of the rivet. A rivet gun may be manually, electrically, pneumatically, hydraulically, or pneudraulically operated. A rivet gun may be auto-fed, compression driven, or orbital driven.

In addition, in the following description the term "object" refers to any component, element, part, or feature of a rivet gun or receptor of a rivet. An object may for example refer to a nose tip, a nose insert, an anvil holder, a collet, or a washer. An object may also refer to a component or components, such as component elements of an aircraft fuselage, for which a rivet is being installed.

Figure 1:
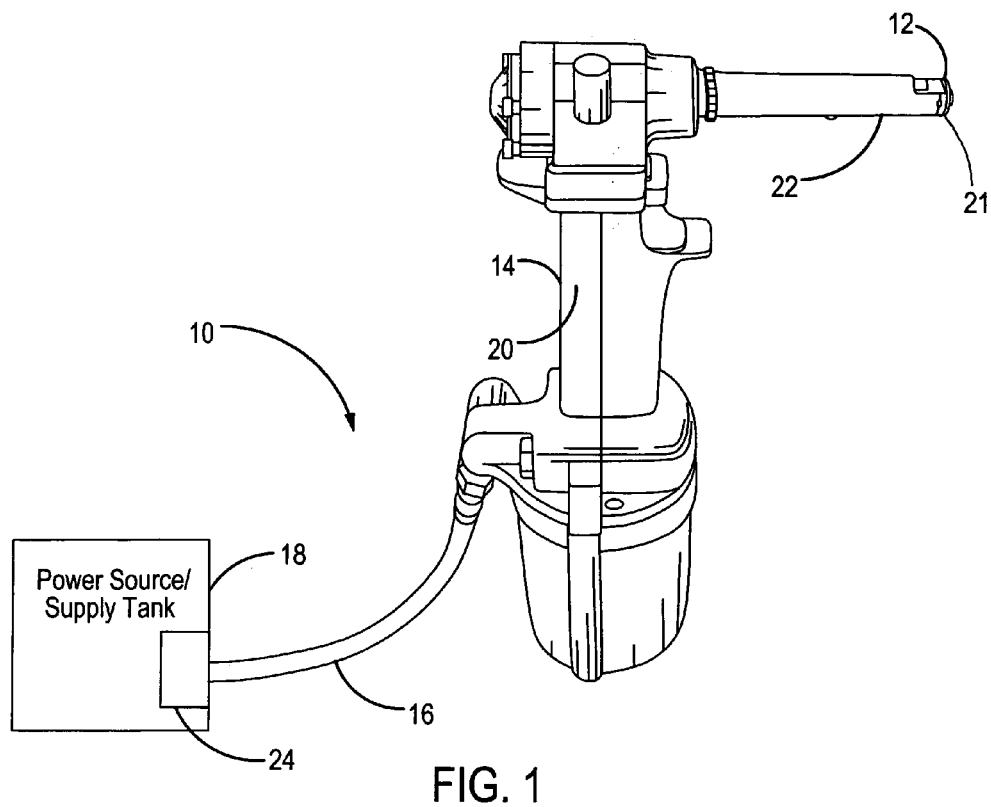
FIG. 1 is a perspective view of a rivet installation system incorporating a driving anvil washer retaining apparatus in accordance with an embodiment of the present invention.

Referring now to FIG. 1, a perspective view of a rivet installation system 10 incorporating a driving anvil washer retaining apparatus 12 in accordance with an embodiment of the present invention is shown. The system 10 includes a rivet gun 14 and may include a supply line 16 and an energy source/supply tank 18, as shown. The rivet gun 14 includes a main body portion 20, the washer retaining apparatus 12 having a magnetic element 21, and a nose or nose assembly 22, which may or may not be included in the washer retaining apparatus 12. In the sample embodiment of FIG. 1, the washer retaining apparatus 12 and the magnetic element 21 are one in the same. The washer retaining apparatus 12 retains a driving anvil washer during the installation of a rivet. Samples of a driving anvil washer and rivet are shown pre-installation in FIG. 5 and post-installation in FIGS. 6 and 7. Although a single magnetic element is shown in FIG. 1, a washer retaining apparatus may incorporate any number of magnetic elements.

The rivet gun 14 may be of various types and styles. The rivet gun 14 may be manually, electrically, pneumatically, hydraulically, or pneudraulically operable or a combination thereof. The rivet gun 14 may be configured to accommodate various washer retaining apparatuses and nose assemblies using techniques known in the art. The rivet gun 14 may receive power via the supply line 16 or may have a portable energy source (not shown), such as a battery pack.

The supply line 16 may be in the form of an electrical line, an air line, or a fluid line. The supply line 16 may supply electrical, pneumatic, or hydraulic energy in the form of electrical current, pressurized air, or pressurized fluid to the rivet gun 14. The supply line 16 may be coupled to the rivet gun 14 and to the energy source/supply tank 18 using various couplers or fasteners known in the art.

The energy source/supply tank 18 may be in the form of an electrical energy source, such as a motor, a transformer, or a power converter, or may be in the form of a pneumatic or hydraulic energy source having a pump, such as pump 24. The pump 24 circulates and pressurizes air or fluid contained within the tank 18 to and from the rivet gun 14. The pump 24 provides a desired pressure of the air or fluid supplied to the rivet gun 14 for proper rivet installation.

Figure 2A:
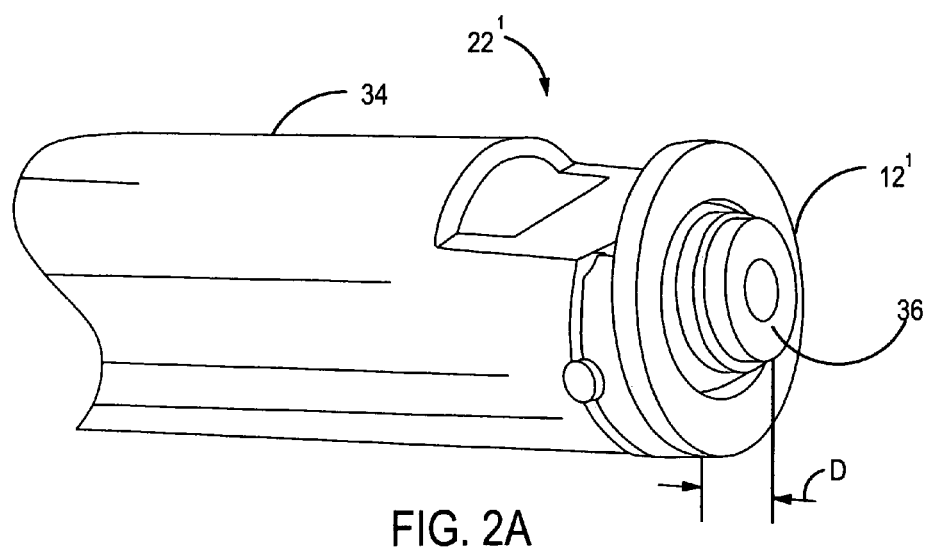
FIG. 2A is a perspective view of a rivet gun nose assembly and a driving anvil washer retaining apparatus in accordance with an embodiment of the present invention.
Figure 2B:
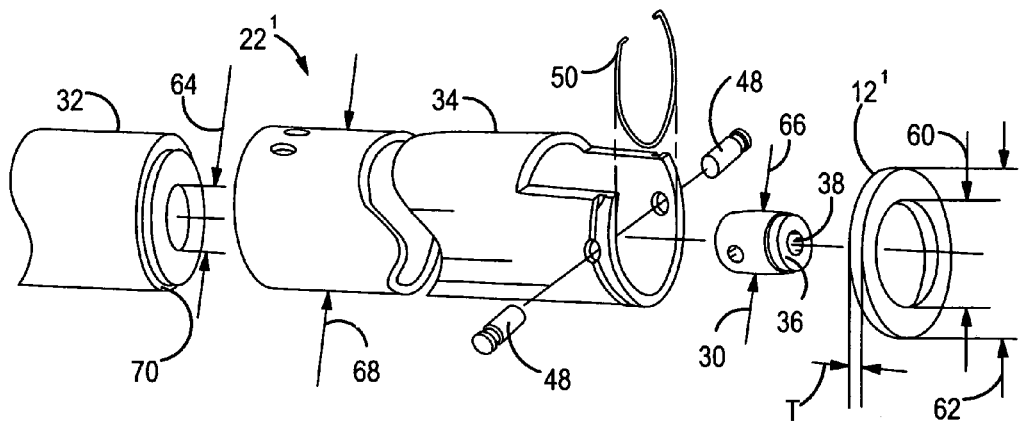
FIG. 2B is an assembled and perspective view of the rivet gun nose assembly and a driving anvil washer retaining apparatus of FIG. 2A.
Figure 3:
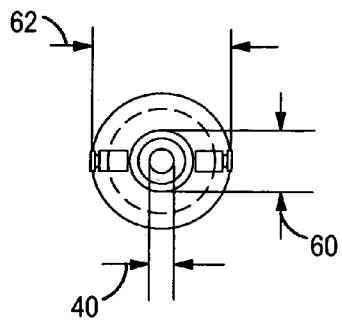
FIG. 3 is a front or end view of the driving anvil washer retaining apparatus and the rivet gun nose assembly of FIGS. 2A and 2B.

Referring now to FIGS. 2A, 2B, and 3, a perspective view, an assembled view, and a front or end view of a rivet gun nose assembly 22' and a driving anvil washer retaining apparatus 12' are shown in accordance with an embodiment of the present invention.

The nose assembly 22' includes an anvil insert 30, an anvil holder 32, and a collet 34. The anvil insert 30 has a nose tip 36 and a stem channel 38 with an insert inner diameter 40 that corresponds with a stem outer diameter of a stem of a rivet assembly, such as stem outer diameter 44 of stem 46 shown in FIG. 5. The insert 30 may be removed and replaced via a pin 48 and "C"-clip or spring retaining clip 50 with various other similar inserts having different sized insert inner diameters to accommodate for various sized stems. The anvil holder 32 holds or is used to apply pressure on a driving anvil washer, such as the driving anvil washer 52 shown in FIGS. 5 and 7. The collet 34 retains the pin 48 and retaining clip 50 and may also be used to apply pressure on a driving anvil washer.

The washer retaining apparatus 12' may include the nose assembly 22'. The washer retaining apparatus 12', as shown, is in the form of a magnetized washer having dimensions that correspond with dimensions of the nose assembly 22'. The washer retaining apparatus 12' has element dimensions that accommodate multiple different rivet gun nose assembly dimensions associated with multiple rivet gun nose-pieces or anvil inserts. The washer retaining apparatus 12' includes an element inner diameter 60 and an element outer diameter 62. The element inner diameter 60 may be approximately equal to a holder inner diameter 64 of the anvil holder 32. The element inner diameter 60 is larger than the insert outer diameters of one or more anvil inserts, such as the outer diameter 66 of the insert 30, but smaller than the outer diameter 68 of the collet 34. The element outer diameter 62 is approximately equal to the collet outer diameter 68. Thickness T of the washer retaining apparatus 12' is approximately equal to or less than a distance D between the nose tip 36 and the end surface 70 of the anvil holder 32. The washer retaining apparatus 12' has surface area dimensions that correspond with end surface area dimensions of the anvil holder 32 and the collet 34. Although one configuration of the washer retaining apparatus 12' is shown, the washer retaining apparatus 12' may be in various forms, styles, shapes, and sizes.

Figure 4:
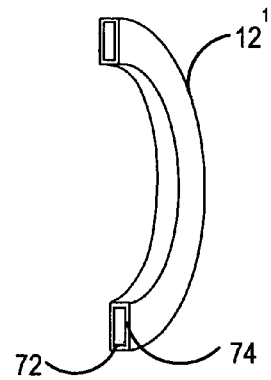
FIG. 4 is a cross-sectional view of the driving anvil washer retaining apparatus of FIGS. 2A and 2B in accordance with another embodiment of the present invention.

The washer retaining apparatus 12' and the nose assembly 22' may be formed of various materials including aluminum, nickel, cobalt, samarium, neodymium, iron, boron, barium, carbon, stratium, zinc, manganese, plastic, ceramic, rubber, or the like, or any combination thereof. In one embodiment of the present invention, the washer retaining apparatus 12' includes an insert body 72 that is formed of a grade 30 neodymium material and an outer shell 74. The insert body 72 and the outer shell 74 are shown in FIG. 4. The outer shell 74 is in the form of a nickel-plating formed over and encasing the insert body 72.

The washer retaining apparatus 12' may be a magnetized portion of the nose assembly 22'. Although, as shown, the washer retaining apparatus 12' is a single magnetized element, the washer retaining apparatus 12' may be in the form of one or more magnetized elements. For example, the insert 30, holder 32, collet 34, or a combination thereof may be magnetized to retain a driving anvil washer during the installation of a rivet.

Figure 5:
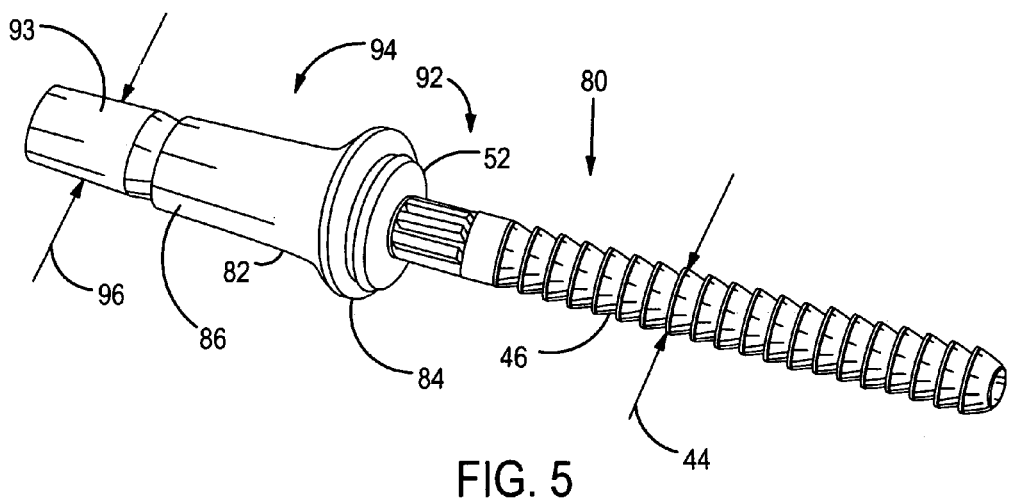
FIG. 5 is a perspective view of a sample rivet assembly.
Figure 6:
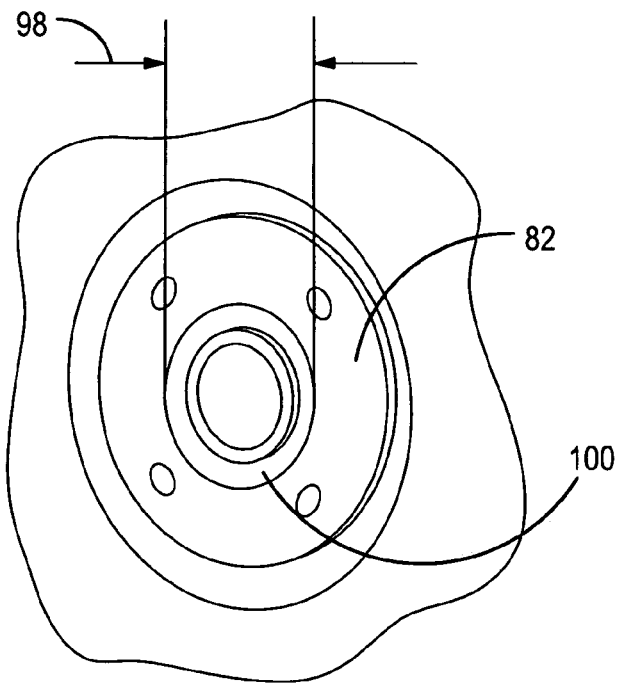
FIG. 6 is a front perspective view of an installed rivet.

Referring now to FIGS. 5 and 6, a perspective view of a sample rivet assembly 80 and a front perspective view of an installed rivet 82 are shown. The rivet assembly 80 includes a rivet 82 having a head 84 and a shank 86. The rivet resides over a stem 46. A driving anvil washer 52 resides on the stem 46 and on the head side 92 of the rivet 82. The stem 46 is shaped such that an end portion 93 of the stem 46 is larger in diameter on the shank side 94 of the rivet 82 than on the inner diameter of the shank 86. The diameter of the end portion 93 of the shank side 94 is designated by numerical indicator 96 and the inner diameter of the shank 86 is designated by numerical indicator 98. The driving anvil washer 52 resides over a locking ring 100, which prevents the rivet 82 from moving along the stem 46 in a direction away from the shank side 94. During the installation of the rivet 46 pressure is applied on the driving anvil washer 52 which is in contact with the ring 100, to assure that the ring 100 does not loosen or become separated from the rivet 82.

Figure 7:
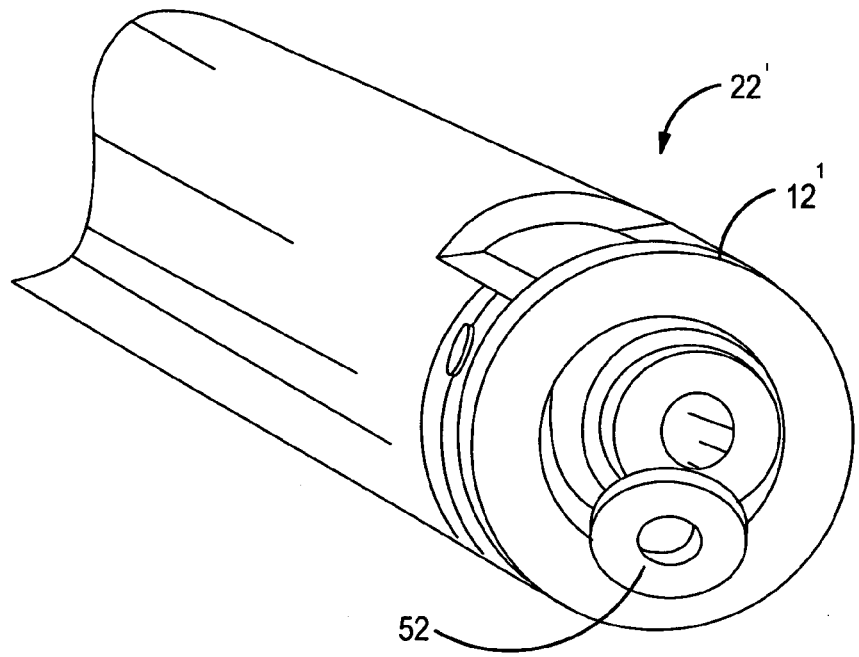
FIG. 7 is a perspective view of a driving anvil washer retaining apparatus after the installation of a rivet and in accordance with an embodiment of the present invention.

Referring now to FIG. 7, a perspective view of the nose assembly 22' having the washer retaining apparatus 12' after installation of a rivet 82 and in accordance with an embodiment of the present invention is shown. During installation the washer retaining apparatus 12' remains coupled to the nose assembly 22'. The driving anvil washer 52 is coupled to and magnetically attracted to the washer retaining apparatus 12', due to the magnetization thereof.

Referring now to FIG. 8, a logic flow diagram illustrating a method of forming a driving anvil washer retaining apparatus, such as the washer retaining apparatus 12', for a rivet gun is shown in accordance with an embodiment of the present invention.

In step 100, nose assembly dimensions are determined for the rivet gun. The inner and outer dimensions of an anvil insert, an anvil holder, a collet, and any other nose assembly dimensions may be determined, such as the insert inner and outer diameters 40 and 66, the holder inner diameter 64, the collet outer diameter 68, and the distance D.

In step 102, element dimensions of the washer retaining apparatus are determined in response to the nose assembly dimensions. When the washer retaining apparatus is in the form of a magnetized element, the element dimensions may include an element inner diameter, an element outer diameter, and a thickness. The element inner diameter may be determined to be larger than an outer diameter of a nose insert and smaller than a collet outer diameter of the rivet gun. The element outer diameter may be determined to be approximately equal to or greater than the outer diameter of a collet of the rivet gun. The thickness may be determined to be approximately equal to or less than a distance between a nose tip and an anvil holder of the rivet gun. The element dimensions may also be determined to accommodate multiple different rivet gun nose dimensions associated with multiple rivet gun nose inserts. The above-stated dimensional relationships are satisfied by the sample inner and outer diameters 60 and 62 and the thickness T of the above-described washer retaining apparatus 12'.

In step 103, desired magnetic strength of the washer retaining apparatus is determined. A minimum magnetic strength is determined such that a driving anvil washer is retained during installation of a rivet. A maximum magnetic strength may also be determined such that a driving anvil washer may be easily removed from a nose assembly of the rivet gun after rivet installation. The maximum magnetic strength may also be determined to minimize the costs of materials and manufacturing of the washer retaining apparatus. In step 104, materials of the washer retaining apparatus are determined in response to the desired magnetic strength. The washer retaining apparatus may be formed of various materials known in the art, some of which are listed above.

In step 105, the washer retaining apparatus is formed in response to the element dimensions, the element materials, and the desired magnetic strength. The washer retaining apparatus may be formed using various techniques known in the art. When the washer retaining apparatus is in the form of a magnetized washer or the like, an insert body may be formed and plated to form the washer retaining apparatus. The insert may be formed of a magnetized material or material composite. When the washer retaining apparatus is in the form of a magnetized portion of a nose assembly, the washer retaining apparatus may be formed through the magnetization of one or more of the components of the nose assembly. During the formation process of the washer retaining apparatus the washer retaining apparatus may be coupled to or formed as part of a nose assembly of the rivet gun. In step 106, the washer retaining apparatus may be coupled to the nose assembly of the rivet gun. The washer retaining apparatus may be magnetically attached, adhered, or coupled via some other technique known in the art to the nose assembly. Steps 105 and 106 may be performed simultaneously. The washer retaining apparatus may be coupled to the nose assembly during formation of the washer retaining apparatus. The washer retaining apparatus may be an integral part of the nose assembly or vice versa.

Referring now to FIG. 9, a logic flow diagram illustrating a method of installing a rivet, such as rivet 82, in accordance with another embodiment of the present invention is shown.

In step 110, a stem, such as stem 46, of a rivet assembly is inserted into a nose assembly of a rivet gun. The rivet gun may have one or more driving anvil washer retaining apparatuses as described above. In step 112, a shank portion of the rivet is inserted into one or more objects to be riveted.

In step 114, the stem is removed from the rivet assembly. In step 116, a driving anvil washer is retained by the washer retaining apparatuses recited in step 110. The driving anvil washer is magnetically coupled to the washer retaining apparatuses. Steps 114 and 116 are performed simultaneously.

The present invention provides a driving anvil washer retaining apparatus, which is capable of retaining a driving anvil washer during the installation of a rivet. The apparatus provides an efficient and improved tool that may be used for the installation of rivets. Use of the apparatus prevents the creation of foreign object debris during the manufacturing of a vehicle. The apparatus saves costs involved in production and manufacturing of an aircraft and post manufacturing costs caused by component malfunctions due to the existence of foreign object debris.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A driving anvil washer retaining apparatus for a rivet gun comprising at least one magnetized element, said at least one magnetized element coupled to said rivet gun and for retaining at least one anvil washer during installation of at least one rivet.

2. An apparatus as in claim 1 wherein said at least one magnetized element is at least a portion of an object selected from at least one of a collet, an anvil holder, a nose, a nose tip, a washer, and an anvil-insert.

3. An apparatus as in claim 1 wherein said at least one magnet element has element dimensions corresponding to nose dimensions of said rivet gun.

4. An apparatus as in claim 1 wherein said at least one magnet element has element dimensions that are such to accommodate a plurality of different rivet gun nose dimensions associated with a plurality of rivet gun noses.

5. An apparatus as in claim 1 wherein said at least one magnet element has element dimensions that comprise an element inner diameter and an element outer diameter.

6. An apparatus as in claim 5 wherein said element inner diameter is larger than a nose insert outer diameter of said rivet gun.

7. An apparatus as in claim 5 wherein said element inner diameter is smaller than a collet outer diameter of said rivet gun.

8. An apparatus as in claim 5 wherein said element outer diameter is approximately equal in size to a collet outer diameter of said rivet gun.

9. An apparatus as in claim 1 wherein thickness of said at least one magnetized element is approximately equal to or less than a distance between a nose tip and an anvil holder of said rivet gun.

10. An apparatus as in claim 1 wherein said at least one magnetized element has surface area dimensions that correspond with anvil holder dimensions and collet dimensions of said rivet gun.

11. An apparatus as in claim 1 wherein said at least one magnetized element is formed at least partially of at least one material selected from aluminum, nickel, cobalt, samarium, neodymium, iron, boron, barium, carbon, stratium, zinc, manganese, plastic, ceramic, and rubber.

12. An apparatus as in claim 1 wherein said at least one magnetized element is plated.

13. An apparatus as in claim 1 wherein said at least one magnetized element is formed of a grade 30 neodymium material and is nickel-plated.

14. An apparatus as in claim 1 wherein said at least one magnetized element comprises: an insert body; and an outer shell encasing said insert body.

15. A driving anvil washer retaining assembly for a rivet gun comprising: a rivet gun nose assembly; and at least one magnetized element coupled to said rivet gun nose assembly for retaining at least one anvil washer during installation of at least one rivet.

16. A retaining assembly as in claim 15 wherein said rivet gun nose assembly comprises: a collet; an anvil holder residing at least partially within said collet; and an anvil insert residing at least partially within said anvil holder.

17. A retaining assembly as in claim 16 wherein at least one of said collet, said anvil holder, and said anvil insert comprise said at least one magnetized element.

18. A retaining assembly as in claim 15 wherein said at least one magnetized element is at least a portion of an object selected from at least one of a collet, an anvil holder, a nose, a nose tip, a washer, and an anvil-insert.

19. A retaining assembly as in claim 15 wherein said at least one magnetized element comprises an element inner diameter and an element outer diameter, said element inner diameter approximately equal to an anvil holder inner diameter of the rivet gun and said element outer diameter approximately equal to a collet outer diameter of the rivet gun.

20. A retaining assembly as in claim 15 wherein thickness of said at least one magnetized element is approximately equal to or less than a distance between a nose tip and an anvil holder of the rivet gun.

21. A driving anvil washer retaining apparatus for a rivet gun comprising at least one magnetized element having element dimensions corresponding to nose dimensions of said rivet gun, said at least one magnetized element configured to couple said nose and retain at least one anvil washer during installation of at least one rivet.

22. An apparatus as in claim 21 wherein said at least one magnetized element comprises: an insert body; and an outer shell encasing said insert body; said insert body and said plated outer shell formed of at least one material selected from aluminum, nickel, cobalt, samarium, neodymium, iron, boron, barium, carbon, stratium, zinc, manganese, plastic, ceramic, and rubber.

\* \* \* \* \*